US008016231B2

(12) United States Patent
Hillen et al.

(10) Patent No.: US 8,016,231 B2
(45) Date of Patent: Sep. 13, 2011

(54) FORCE SUPPORTING DEVICE

(75) Inventors: Jörg Hillen, Nörtershausen (DE); Peter Kohns, Vallendar (DE); Thorsten Müller, Rhens (DE); Michael Rüdesheim, Niederburg (DE); Dieter Wendling, Kastellaun (DE)

(73) Assignee: Stabilus GmbH, Koblenz (DE)

( * ) Notice: Subject to any disclaimer, the term of this patent is extended or adjusted under 35 U.S.C. 154(b) by 887 days.

(21) Appl. No.: 12/009,896

(22) Filed: Jan. 22, 2008

(65) Prior Publication Data

US 2008/0180006 A1 Jul. 31, 2008

(30) Foreign Application Priority Data

Jan. 23, 2007 (DE) ........................ 10 2007 003 363

(51) Int. Cl.
*B64D 11/00* (2006.01)

(52) U.S. Cl. .................................................... 244/118.5

(58) Field of Classification Search ............... 244/118.1, 244/118.5; 312/247, 248
See application file for complete search history.

(56) References Cited

U.S. PATENT DOCUMENTS 5,244,269 A 9/1993 Harriehausen et al.
5,441,218 A * 8/1995 Mueller et al. ............ 244/118.1
5,839,694 A * 11/1998 Bargull et al. ............ 244/118.1
5,934,615 A * 8/1999 Treichler et al. .......... 244/118.5
6,045,204 A * 4/2000 Frazier et al.
6,484,969 B2 * 11/2002 Sprenger et al. .......... 244/118.5
7,121,510 B2 * 10/2006 Ritts ........................ 244/118.5
7,143,977 B2 * 12/2006 Graf et al.
7,258,406 B2 * 8/2007 Stephan et al.
7,726,606 B2 * 6/2010 Graf et al.
2002/0175244 A1 * 11/2002 Burrows et al. ........... 244/118.1
2004/0245897 A1 * 12/2004 Stephan et al. .............. 312/246
2005/0218264 A1 * 10/2005 Graf et al.
2005/0230541 A1 * 10/2005 Graf et al. ................. 244/118.5

FOREIGN PATENT DOCUMENTS

DE 43 35 151 4/1995
DE 44 46 772 5/1996
DE 102 22 123 * 11/2003
DE 102 22 125 * 11/2003
DE 10 2004 049 700 4/2006
WO WO 03/033 346 * 4/2003

* cited by examiner

*Primary Examiner* — Tien Dinh
(74) *Attorney, Agent, or Firm* — Cozen O'Connor

(57) ABSTRACT

A force supporting device for assisting a force required to move a flap of an overhead baggage compartment from an open position to a closed position includes a blockable piston cylinder unit attached to the flap for assisting the force required to move the flap, and a triggering device for blocking and releasing the blockable piston cylinder unit as a function of loading of the flap.

14 Claims, 2 Drawing Sheets

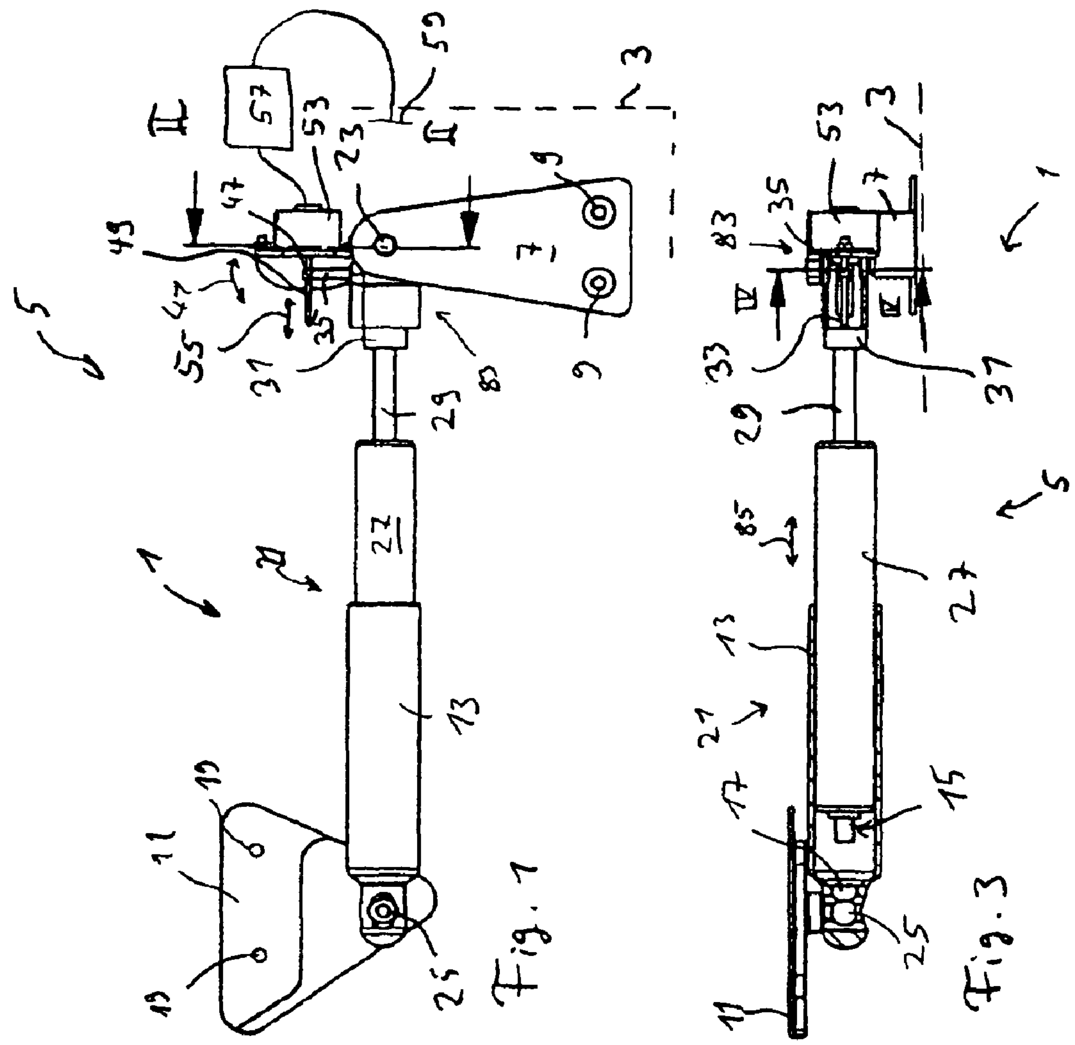
Fig. 1
Fig. 3
57
53
23
13
29
31
35
47
49
55
3
9
11
19
25
27
33
37
15
17
21
83
85
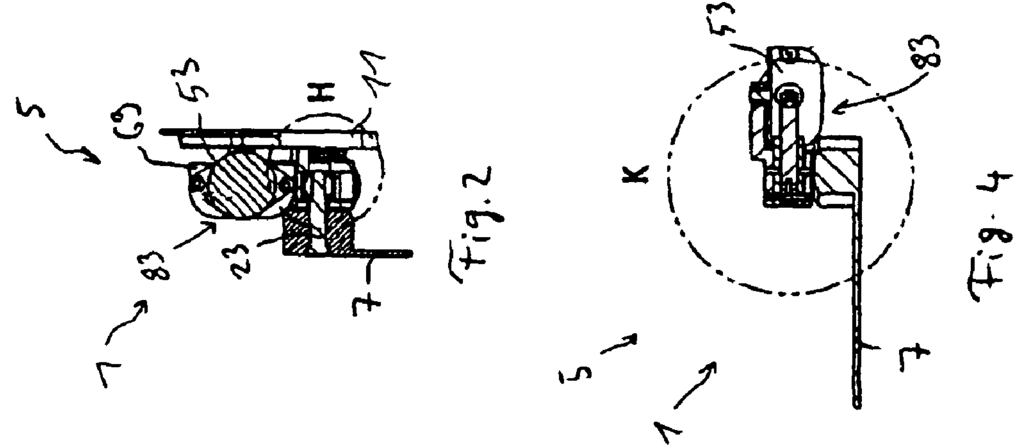
Fig. 2
Fig. 4
53
83
23
7
11
H
K
5
1

FORCE SUPPORTING DEVICE

BACKGROUND OF THE INVENTION

1. Field of the Invention

The invention relates to a force supporting device for assisting the force of an adjustment movement of a flap, in particular a chute of an overhead baggage compartment, from an open position into a closed position, with a triggering device for activating and deactivating the force supporting device as a function of loading of the flap.

2. Description of the Related Art

Force supporting devices are known. They are used, for example, to assist forces for overhead baggage compartments of passenger aircraft, the manual actuating force for closing the overhead baggage compartment being reduced. U.S. Pat. No. 5,244,269 discloses an overhead baggage compartment with a lowerable shell, in particular for a passenger aircraft, closing the baggage compartment requiring merely a low manual force which is substantially independent of the weight of the shell. DE 10 2004 049 700 A1 discloses a force supporting device with a load-dependent force supporting means, in particular for a lowerable overhead baggage compartment in an aircraft. DE 44 46 772 C1 discloses a device for guiding a lowerable shell for an overhead baggage compartment with a weigh plate and pressure transducers connected to an adjustment cylinder via at least one adjustment connection, an appropriate torque counteracting a load moment resulting from the weight of the shell. DE 43 35 151 A1 discloses an overhead baggage compartment with a lowerable shell having a supporting means which is activatable via a triggering mechanism.

SUMMARY OF THE INVENTION

The object of the invention is to provide an improved, in particular an alternative, force supporting device for supporting the force of an adjustment movement of a flap of an overhead baggage compartment that can be manufactured simply and inexpensively.

According to the invention, the force supporting device has a blockable piston cylinder unit which can be attached to the flap for supporting the adjustment movement, the triggering device having, for activating and deactivating the force supporting device, a blocking device for blocking and releasing the blockable piston cylinder unit. The piston cylinder unit can advantageously introduce forces into the flap, so manual actuation, for example manual raising of the flap to move it into the closed position, can be carried out in a simplified or force-supporting manner. For this purpose, the force supporting device can be activated as a function of the loading of the chute, wherein the piston cylinder unit can accordingly be released by the blocking device. The piston cylinder unit can serve as an energy storage means which is charged during opening of the flap and accordingly releases energy during closing for the purposes of supporting forces. The flap is preferably a chute.

In order to avoid excessive force supporting, in particular in the case of low loads, such as might lead, for example, to automatic closing of the flap, the piston cylinder unit can advantageously be blocked by means of the blocking device. When the piston cylinder unit is blocked, it cannot introduce into the flap any forces for the purposes of supporting forces. This is advantageously beneficial when the flap is subjected only to low loads or is not loaded at all.

A preferred embodiment of the invention is characterized in that the triggering device has at least one stepper motor. The triggering device can advantageously be electrically activated via the stepper motor. Stepper motors can advantageously have comparatively low power consumption, so comparatively small and light current-carrying wires, for example wires configured merely for the carrying of weak control currents, are sufficient to activate the stepper motor and thus the triggering device.

A further preferred embodiment of the invention is characterized in that the stepper motor is configured as a linear motor. The linear motor can exert linear forces to trigger the force supporting device.

A further preferred embodiment of the invention is characterized in that the triggering device has a pivotable actuating lever, a first lever arm of the actuating lever being assigned to the stepper motor and a second lever arm of the actuating lever being assigned to a triggering head of the piston cylinder unit. Advantageously, the lever arms may differ in length, so the actuating lever produces transmission for actuating the triggering head so as to block or release the piston cylinder unit. Advantageously, the first lever arm may, for example, be longer than the second lever arm of the actuating lever. The first lever arm can be adjusted by the linear forces of the stepper motor which is configured as a linear motor. Advantageously, for this purpose, the greater length of the first lever arm allows the linear motor to be configured so as to be comparatively weak, i.e. much smaller and requiring much lower power consumption. This allows the stepper motor or the linear motor to be activated also via control wires configured merely for the carrying of even smaller currents.

A further preferred embodiment of the invention is characterized in that the triggering device is assigned to a control unit for activating the stepper motor. The control unit may, for example, be configured as a servo controller for activating the stepper motor.

A further preferred embodiment of the invention is characterized in that there is assigned to the control unit a weighing base assigned to the chute for determining the loading of the flap. The weighing base can be assigned to the flap, for example attached to the base thereof, in such a way that the loads, i.e. for example the weight of the items of baggage stored therein, can be measured via the flap. Resulting from this measurement, the control unit can advantageously generate a corresponding pulse or a plurality of corresponding pulses for activating the stepper motor. Advantageously, it is, for example, possible to activate the triggering device once a certain minimum weight has been reached, i.e. to adjust the stepper motor, so the piston cylinder unit is released and can exert the corresponding force support.

A further preferred embodiment of the invention is characterized in that the triggering device is activatable on reaching minimum loading of the flap, preferably on reaching 50% of the maximum loading of the flap. Advantageously, this allows the manual forces required for actuation to be at least halved, irrespective of the degree of loading. Even in the event of maximum loading, approximately 50% of the actuating forces can be applied by the force supporting device.

A further preferred embodiment of the invention is characterized in that the force supporting device is assignable to the flap of the overhead baggage compartment via a first angular metal sheet. The first angular metal sheet can for this purpose be connected to the chute in a known manner, for example by welding, screwing, riveting, bonding, soldering and/or the like. The supporting forces applied by the piston cylinder unit can be introduced into the flap via the angular metal sheet.

A further preferred embodiment of the invention is characterized in that the force supporting device has a sliding bearing for guiding the piston cylinder unit. Advantageously, the piston cylinder unit can be guided via the sliding bearing even when blocked.

A further preferred embodiment of the invention is characterized in that the sliding bearing has a telescopic tube for guiding the piston cylinder unit, in particular a pressure pipe of the piston cylinder unit. For guiding the piston cylinder unit, the pressure tube of the piston cylinder unit can advantageously slide back and forth within the telescopic tube.

A further preferred embodiment of the invention is characterized in that the telescopic tube has an end stop, a counter-stop of the piston cylinder unit, in particular a free end of the pressure tube, striking against the end stop in a force-supporting manner when the piston cylinder unit is unlocked. Forces from the force supporting device or from the piston cylinder unit of the force supporting device can therefore be transmitted to the chute via the counter-stop striking against the end stop.

A further preferred embodiment of the invention is characterized in that the piston cylinder unit, when blocked, can be guided in a sliding manner in the telescopic tube, no forces being supported. The telescopic tube can be used to ensure that the piston cylinder unit can be mounted or guided accordingly even when blocked.

A further preferred embodiment of the invention is characterized in that the force supporting device has a swivelable motor holder for mounting the stepper motor. The swivelable motor holder can prevent stresses which can possibly occur during the conversion of the linear forces of the stepper motor into rotational movement of the actuating lever, wherein the stepper motor can be adjusted via the motor holder in accordance with the pivot angle of the actuating lever. However, other devices for the conversion of linear forces into torques are also conceivable, for example the provision of a sliding bolt of the linear motor that is guided in a slot in the actuating lever.

A further preferred embodiment of the invention is characterized in that there is assigned to the flap a damper for damping the adjustment movement. In order to prevent the actuating forces for actuating the flap from becoming too great in any of the intermediate positions which are possibly conceivable and in order to avoid excessively rapid and sudden movements of the flap, adjustment movements of the flap between its open position and the closed position can accordingly be damped via the damper.

A further preferred embodiment of the invention is characterized in that an end switch is provided for switching off the triggering devices in the closed position. Advantageously, the triggering device can be switched off in the closed position which requires no force support, allowing valuable electrical energy to be saved and also preventing possible overloading of the stepper motor.

The object of the invention is also achieved, in the case of an overhead baggage compartment with a flap which is adjustable between a closed position and an open position, by at least one force supporting device as described above.

Further advantages, features and details will emerge from the following description in which an embodiment is described in detail with reference to the drawings. Identical, similar and/or functionally identical parts are provided with the same reference numerals.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 is a side view of a force supporting device;

FIG. 2 is a cross section of the force supporting device taken along line II-II from FIG. 1;

FIG. 3 is a partial longitudinal section of the force supporting device from FIGS. 1 and 2;

FIG. 4 is a cross section taken along lines IV-IV from FIG. 3;

DETAILED DESCRIPTION OF THE PRESENTLY PREFERRED EMBODIMENTS

Figure 5:
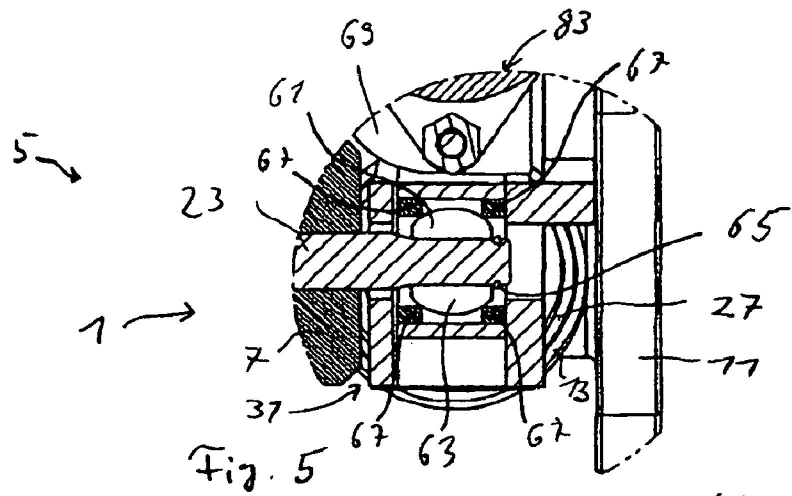
FIG. 5 is a detailed view of a detail shown in FIG. 2 and denoted by letter H.

FIG. 1 is a side view of a force supporting device 1 for supporting the force of an adjustment movement of a chute 3 of an overhead baggage compartment 5. In FIG. 1, the chute 3 is indicated merely by a broken line and can be attached to the force supporting device 1 via a first angular metal sheet 7. For this purpose, the first angular metal sheet 7 has two holes 9. The attachment can be carried out in any desired manner, for example by screwing or riveting and/or additional bonding of the first angular metal sheet 7 to the chute 3.

The force supporting device 1 can be attached to a stationary element (not illustrated in FIG. 1), for example a part fixedly attached to a fuselage of a passenger aircraft, by means of a second angular metal sheet 11. For this purpose, the second angular metal sheet 11, like the first angular metal sheet 7, has two holes 19. The part which is stationary relative to the movable sheet 7 may also be a stationary housing part of a baggage compartment of the passenger aircraft. Arranged between the angular metal sheets 7 and 11 is a piston cylinder unit 21 which is mounted so as to be able in each case to pivot, relative to the first angular metal sheet 7 and the second angular metal sheet 11, by means of a bolt 23 which is attached to the first angular metal sheet 7 and a holder 25 which is attached to the second angular metal sheet 11.

The piston cylinder unit 21 is configured to transmit forces between the first angular metal sheet 7 and the second angular metal sheet 11 via the bolt 23 and the holder 25. These forces applied by the piston cylinder unit 21 can serve to support forces during closing of the chute 3 of the force supporting device 1.

The piston cylinder unit 21 has, as may be seen in FIG. 3, a pressure tube 27 and a piston rod 29 mounted movably therein. The pressure tube 27 is mounted in a sliding manner in a telescopic tube 13 and has at a free end a counter-stop 15 which strikes against an end stop 17 of the telescopic tube 13 or a base of the telescopic tube 13 in a force-supporting manner. A cylindrical outer face of the pressure tube 27 and a cylindrical inner face of the telescopic tube 13 form a sliding bearing for the pressure tube. The piston cylinder unit 21 may be a gas spring, a medium which is pressurized in the pressure tube 27 expelling the piston rod 29. Specifically, the piston cylinder unit 21 is configured as a blockable gas spring, the piston rod 29 being attached to a triggering head 21. For blocking or unlocking the piston cylinder unit 21, i.e. for securing or releasing the movable piston rod 29, a triggering pin 33 is guided in the piston rod 29 and in the extension in the triggering head 31. The triggering pin 33, which may be seen in FIG. 3, can be moved toward the left and right in the orientation of FIG. 3, allowing a valve assembly located inside the pressure tube 27 to be actuated for blocking or releasing the piston rod 29.

Figure 6:
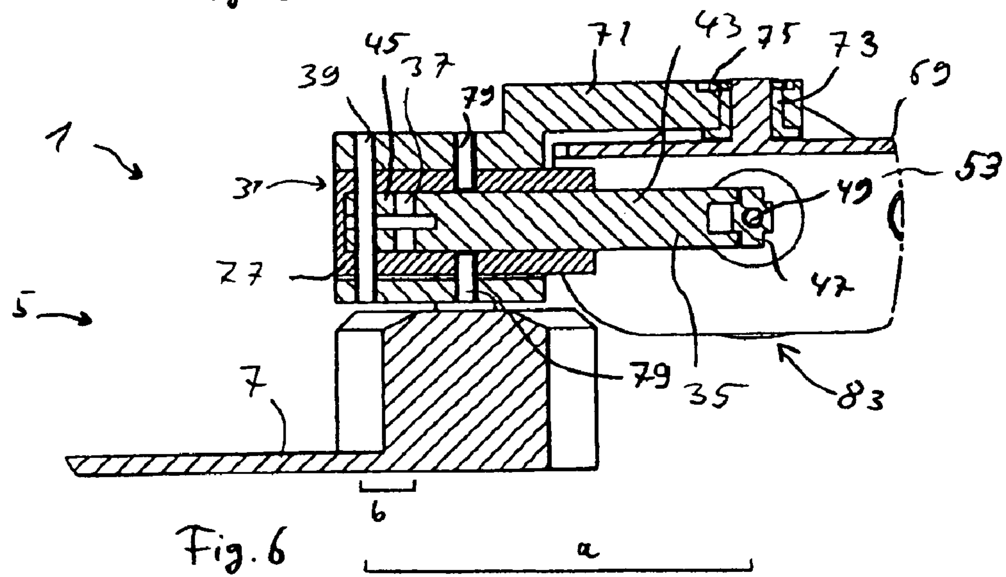
FIG. 6 is a detailed view of a detail shown in FIG. 4 and denoted by letter K.

FIG. 2 is a cross section taken along line II-II from FIG. 1. FIG. 4 is also a cross section, although in this case taken along line IV-IV from FIG. 3. FIG. 5 shows a detail denoted by H from FIG. 2 and FIG. 6 shows a detail denoted by K from FIG. 4.

The triggering pin 33 is attached to an actuating lever 35 or is in engagement with a recess 37 in the actuating lever 35. The actuating lever 35 is mounted so as to be able to pivot with the aid of a bearing pin 39. In FIG. 1, a double-headed arrow 41 indicates the possible pivoting movement of the actuating lever 35. The actuating lever 35 has a first lever arm 43 and a second lever arm 45, the first lever arm 43 having a relatively long length a and the second lever arm 45 having a comparatively shorter length b. Lengths a, b are indicated in FIG. 6.

For pivoting the actuating lever 35, the actuating lever is assigned to a motor spindle 49 of a stepper motor configured as a linear motor 53 via a spindle nut 47. The linear motor 53 allows the motor spindle 49 to be moved back and forth linearly, toward the right and left as viewed in the orientation of FIG. 1, and this is indicated in FIG. 1 by a double-headed arrow 55. The spindle nut 47 is screwed onto the motor spindle 49 and is in engagement with the actuating lever 35 or strikes, coming from the right as viewed in the orientation of FIG. 1, against the actuating lever 35 in such a way that on adjustment movement of the linear motor 53 from right to left—viewed in the orientation of FIG. 1—the actuating lever is also pivoted toward the left. The triggering pin 33 of the piston cylinder unit 21 is in this case moved toward the left, i.e. pressed into the piston rod 29, in accordance with the transmission of the actuating lever 35, in accordance with lengths a and b. This movement of the triggering pin 33 allows a corresponding valve to be opened inside the piston cylinder unit, thus allowing the piston cylinder unit to be released.

To activate the linear motor 53, the linear motor is assigned to a control unit 57. The control unit 57 is, in turn, assigned to the chute 3 from which it obtains information about the state of loading, for example with items of baggage, of the chute 3 via a weighing device 59 which is merely indicated in FIG. 1. Advantageously, the control unit 57 can start up the linear motor 53 from a certain minimum load determined by the weighing device 59, so the motor spindle 49 moves from left to right, viewed in the orientation of FIG. 1, i.e. releases the piston cylinder unit 21 via the actuating lever 35. Preferably, this may take place approximately from 50% loading of the chute. A typical maximum weight of the chute 3 may be 70 kg, so the motor spindle 49 can be actuated from right to left, viewed in the orientation of FIG. 1, for actuating the triggering pin 33 and thus for releasing the piston rod 29, for example from loading of the chute 3 with 35 kg.

As may be seen in FIG. 5, a hinge bearing 61 is assigned to the bolt 23 which is attached to the first angular metal sheet 7. The hinge bearing 61 has a ball 63 which is attached to the bolt 23 and held on the bolt 23 by a Seeger round-wire snap ring 65. Two support rings 67 are provided for mounting the ball 63 of the hinge bearing 61. The ball 63 is assigned to the triggering head 31 and, via the triggering head, to the piston rod 29.

As may be seen in FIG. 6, the linear motor 53 is assigned to a motor holder 69. The motor holder 69 is mounted so as to be able to pivot relative to the motor base plate 71 via a flange sleeve 73 and a Seeger circlip ring 75. The actuating lever 35 is mounted in a U-shaped bearing metal sheet 77, the motor base plate 71 being connected to the bearing metal sheet 77. The actuating lever 35 is therefore mounted so as to be able to pivot relative to the bearing metal sheet 77 and the motor base plate 71. For this purpose, the bearing metal sheet 77 is introduced into the motor base plate 71 and the bearing pin 39 into the actuating lever 35. Both the linear motor 53 and the actuating lever 35 assigned thereto are therefore mounted so as to be able to pivot relative to the motor base plate 71. As may be seen, disengaging of the motor spindle 49 in accordance with the kinematics of the actuating lever 35 automatically causes pivoting movement of the linear motor 53, as the actuating lever 35 is attached to the motor spindle 49 so as to be able to pivot via the spindle nut 47. Two clamping pins 79, which each engage the motor base plate 71 and the bearing metal sheet 77, are provided for fixing the bearing metal sheet 77 to the motor base plate 71.

Figure 7:
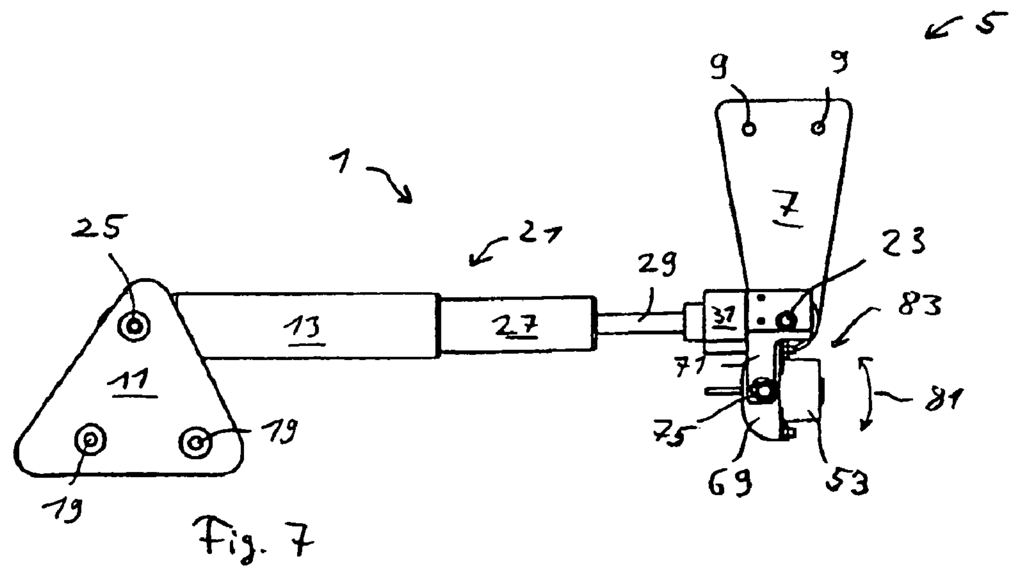
FIG. 7 is a side view from behind of the force supporting device illustrated in FIG. 1.

FIG. 7 is a side view from behind of the force supporting device 1 shown in FIG. 1. There may be seen, in particular, the motor holder 69 which is mounted so as to be able to pivot relative to the motor base plate 71 with the linear motor 53 linked thereto. The possibility of pivoting the linear motor 53 relative to the remainder of the force supporting device 1 is indicated by a double-headed arrow 81.

Advantageously, a respective force supporting device 1 can be attached on either side between a housing wall (not shown) of the overhead baggage compartment 5 and the chute 3. Each of the force supporting devices 1 can have a respective triggering device 83.

In particular, the control unit 57, the linear motor 53, the actuating lever 35 and the triggering head 31 with the triggering pin 33 and the valve assembly (which is not visible) of the piston cylinder unit 21 are parts of this triggering device 83. The triggering device(s) 83 can, for example from loading of the chute 3 with a total weight of 35 kg, support a movement for closing the chute. For this purpose, the chute 3 has the weighing device 59 which can measure the current state of loading of the chute 3. If the weight of the chute 3, for example including its contents, is greater than 35 kg, one of the linear motors 53 is in each case switched on per side via the control unit 57.

The stepper motor 53 is screwed onto the motor holder 69 which is able to rotate relative to the motor base plate 71. The motor base plate 71 is rigidly connected to the triggering head 31 of the piston cylinder unit 21 and to the actuating lever 35 which is able to pivot relative thereto, in particular via the clamping pins 79, preferably via further clamping pins. When the linear motor 53 is switched on, the linear motor presses the spindle nut 47 against the actuating lever 35 of the triggering head 31. As a result of the rotational movement of the actuating lever 35, the blockable piston cylinder unit 21 is unlocked, so the piston cylinder unit 21 is then able to exert an opposing force on the chute 3, allowing the chute to be closed much more easily by hand. In this case, as seen in FIG. 3, a free end or counter-stop 15 of the pressure tube 27 strikes against the end stop 17 which is located within the telescopic tube 13. The telescopic tube 13 is assigned to the second angular metal sheet 11 so as to be able to pivot via the holder 25. In FIG. 3, the piston cylinder unit 21 is shown in the blocked state, so the pressure tube 27 is able to move freely within the telescopic tube 13 from left to right, as viewed in the orientation of FIG. 3, and this is indicated by a double-headed arrow 85.

If the chute 3 has a weight of approximately 35 kg, almost the entire weight force is compensated for by the piston cylinder unit 21 striking within the telescopic tube 13, so only a low force is required for closing the chute 3. When the chute 3 is fully loaded, the required closing force is halved compared to a system without force support. If the chute 3 has a total weight of less than 35 kg, the triggering device 83 is not actuated, so the piston cylinder unit 21 remains in the inserted position, the piston rod 29 therefore being inserted in the pressure tube 27. For mounting the piston cylinder unit 21, the pressure tube 27 can then slide back and forth within the telescopic tube 13 (FIG. 3).

Fastening on the side of the piston rod 29 is carried out via the hinge bearing 61 which is integrated in the triggering head 31. This hinge bearing 61 contains the bolt 23 which is integrated into the angular metal sheet 7 for fastening the piston cylinder unit 21 on the side of the piston rod. This angular metal sheet 7 is fastened to the chute 3. The pressure tube 27 of the piston cylinder unit 21 is guided in the telescopic tube 13 which is fastened to a housing (not shown) of a baggage compartment of the passenger aircraft (also not shown) by means of the second angular metal sheet 11 via the holder 25 which can have a ball journal. The damping of the opening and closing movement of the chute 3 can be achieved by an additional damper not shown in the figures. This damper can be fastened to the chute 3 on the side of the piston rod and be connected to a housing of a hat rack case or an overhead baggage compartment on the side of the housing.

An end switch (not shown), which can be actuated by a housing of the damper (not shown) when the chute 3 is closed, can be attached to the chute 3. The linear motor 53 of the triggering device 83 of the piston cylinder unit 21 can be switched off using this end switch. As an alternative to the described piston cylinder unit 21, use may also be made of a piston cylinder unit allowing, as an emergency operation, insertion even without triggering of the triggering device 83, if appropriate with increased force.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A force supporting device for assisting a force required to move a flap of an overhead baggage compartment from an open position to a closed position, the device comprising:

a blockable piston cylinder unit attached to the flap for assisting the force required to move the flap;

a triggering device for blocking and releasing the blockable piston cylinder unit as a function of loading of the flap; and a sliding bearing for guiding the piston cylinder unit, wherein the bearing comprises a guide tube that receives the piston cylinder unit telescopically.

2. The force supporting device of claim 1 wherein the triggering device comprises at least one stepper motor.

3. The force supporting device of claim 2 wherein the stepper motor is a linear motor having a spindle which moves linearly.

4. The force supporting device of claim 2 wherein the triggering device comprises a pivotable actuating lever having a first lever arm acted on by the stepper motor, and a second lever arm which acts on the piston cylinder unit.

5. The force supporting device of claim 2 further comprising a control unit for activating the stepper motor.

6. The force supporting device of claim 5 further comprising a weighing device for determining the loading of the flap, the control unit being connected to the weighing device.

7. The force supporting device of claim 6 wherein the control unit activates the triggering device when a predetermined loading of the flap is reached.

8. The force supporting device of claim 1 wherein the guide tube has an end stop, the piston cylinder unit comprising a pressure tube having a free end which strikes the end stop when the piston cylinder unit is released by the triggering device.

9. The force supporting device of claim 1 wherein the piston cylinder unit, when blocked, can slide freely in the guide tube without assisting any force.

10. The force supporting device of claim 2 further comprising a pivotable motor holder, the stepper motor being mounted to the motor holder.

11. The force supporting device of claim 1 further comprising a damper for damping the movement of the flap.

12. The force supporting device of claim 1 further comprising an end switch for switching off the triggering device when the flap is in the closed position.

13. A force supporting device for assisting a force required to move a flap of an overhead baggage compartment from an open position to a closed position, the device comprising:

a blockable piston cylinder unit attached to the flap for assisting the force required to move the flap;

a triggering device for blocking and releasing the blockable piston cylinder unit as a function of loading of the flap; and a first metal plate which can be fixed to the flap, the triggering device being attached to the first metal plate.

14. An overhead baggage compartment comprising:

a flap which can be moved between an open position and a closed position;

a blockable piston cylinder unit attached to the flap for assisting the force required to move the flap;

a triggering device for blocking and releasing the blockable piston cylinder unit as a function of loading of the flap; and a sliding bearing for guiding the piston cylinder unit, wherein the bearing comprises a guide tube that receives the piston cylinder unit telescopically.

* * * * *